(12) United States Patent
Milford

(10) Patent No.: US 10,775,617 B2
(45) Date of Patent: Sep. 15, 2020

(54) EYE TRACKED LENS FOR INCREASED SCREEN RESOLUTION

(71) Applicant: GOOGLE LLC, Mountain View, CA (US)

(72) Inventor: Peter Milford, Los Gatos, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/259,040

(22) Filed: Jan. 28, 2019

(65) Prior Publication Data

US 2020/0132990 A1   Apr. 30, 2020

Related U.S. Application Data

(60) Provisional application No. 62/749,994, filed on Oct. 24, 2018.

(51) Int. Cl.
| | |
|---|---|
| G02B 27/00 | (2006.01) |
| G02B 27/09 | (2006.01) |
| G02B 27/01 | (2006.01) |
| G02B 30/27 | (2020.01) |

(52) U.S. Cl.
CPC ..... *G02B 27/0093* (2013.01); *G02B 27/0172* (2013.01); *G02B 27/0955* (2013.01); *G02B 30/27* (2020.01)

(58) Field of Classification Search
CPC . G02B 30/27; G02B 27/0172; G02B 27/0955
See application file for complete search history.

(56) References Cited

U.S. PATENT DOCUMENTS

| | | | |
|---|---|---|---|
| 10,234,696 B2* | 3/2019 | Popovich | G02B 27/48 |
| 2010/0149073 A1* | 6/2010 | Chaum | G02B 27/0093 345/8 |
| 2018/0275410 A1* | 9/2018 | Yeoh | H04N 13/383 |

* cited by examiner

*Primary Examiner* — Nelson M Rosario

(57) ABSTRACT

A near-eye display system includes a display panel to display a near-eye lightfield frame including an array of elemental images and an eye tracking component to track a pose of a user's eye. The system further includes a de-magnification optical element and a rendering component to adjust the rendering of foveal image content in the integral lightfield frame based on the pose of the user's eye. A method of operation of the near-eye display system includes determining, using an eye tracking component of the near-eye display system, a first pose of a user's eye and decreasing a magnification level at which foveal image content is to be displayed within the foveal field of view for the first pose. The decreased magnification level of the foveal image content is perceptible at a resolution higher than a native resolution of the display panel.

14 Claims, 4 Drawing Sheets

EYE TRACKED LENS FOR INCREASED SCREEN RESOLUTION

CROSS-REFERENCE TO RELATED APPLICATION

The present application claims priority to U.S. Provisional Patent Application No. 62/749,994, entitled "EYE TRACKED LENS FOR INCREASED SCREEN RESOLUTION", and filed on Oct. 24, 2018, the entirety of which is incorporated by reference herein.

BACKGROUND

Head-mounted displays (HMDs) and other near-eye display systems can utilize an integral lightfield display or other computational display to provide effective display of three-dimensional (3D) graphics. Generally, the display systems employ one or more display panels and an array of lenslets, pinholes, or other optic features that overlie the one or more display panels. As HMDs generally have wide viewing angles (e.g., the angle subtended from corners of the image to the pupil of the viewer's eye), image resolution is an important factor, especially in virtual reality (VR) and augmented reality (AR) display systems requiring considerable computing resources and transmission bandwidth to generate high-resolution imagery for viewer immersion. The impact on resources can be especially problematic systems utilizing HMDs, as the high-throughput image rendering and transmission processes are performed in parallel for each eye of a user.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
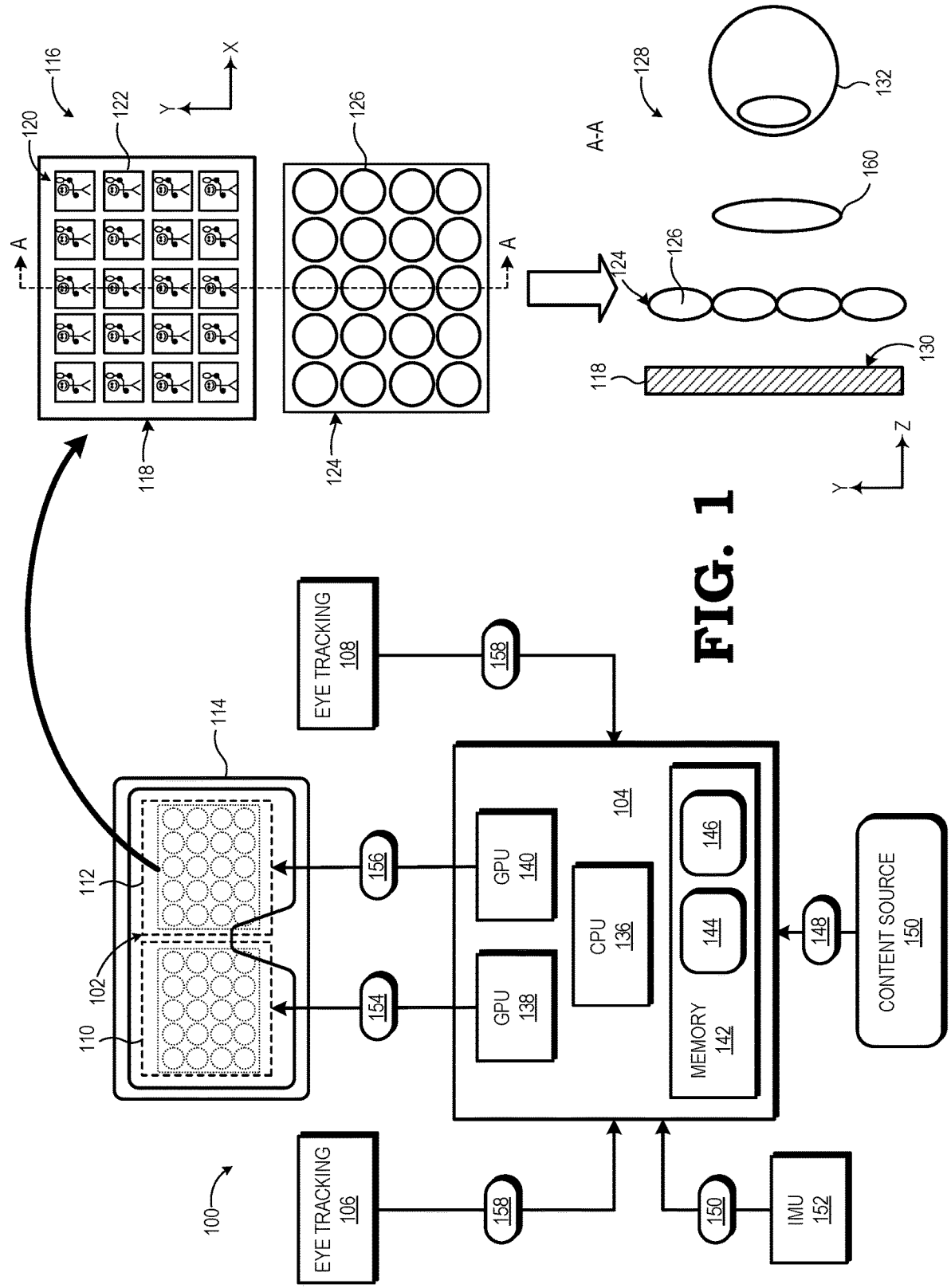
FIG. 1 is a diagram illustrating a near-eye display system employing eye tracking and corresponding lens shifting to provide resolution enhancement in a foveal field of view in accordance with some embodiments.

Resolution requirements of VR displays are increasing for the display of more photo-realistic imagery, which in turns increases the amount of computational power expected from graphics-rendering hardware and software to render images. However, higher resolution display panels generally have higher power, computational and rendering requirements, and also higher transmission bandwidth requirements. Users are further increasingly relying on mobile devices with limited specifications and processor capacity for graphics rendering and display. As a result, a challenge for existing VR and AR systems is combining realistic images with low-latency rendering to prevent interference with user immersion in the VR or AR experience. For example, one factor contributing to rendering latency is the resolution of the VR display. In general, displays with larger numbers of pixels require more rendering computations and thus may experience greater latency. This is particularly the situation in systems that utilize HMD devices, as the high-throughput image rendering and transmission processes are performed in parallel for each eye of a user.

As the number of rendering computations required for display of imagery on computational displays are proportional to the amount of pixels of the display, an attempt to increase display panel resolution generally results in image quality improvements that do not outweigh the costs of increased computational load. For example, display panels typically include arrays of pixels with uniform pixel density throughout the display. However, human vision has high resolution only in the center of the field of view. Therefore, rendering images at high resolution outside the center of the user's field of view on the display may be unnecessary, and may contribute to higher latency without improving the user's experience.

FIGS. 1-4 illustrate example methods and systems for foveal image content demagnification to provide resolution enhancement in a foveal field of view based on user eye pose in a display system. In at least one embodiment, the display system employs a computational display to display integral lightfield frames of imagery to a user so as to provide the user with an immersive virtual reality (VR) or augmented reality (AR) experience. Each integral lightfield frame is composed of an array of elemental images, with each elemental image representing a view of an object or scene from a different corresponding viewpoint. An array of lenslets overlies the display panel and operates to present the array of elemental images to the user as a single autostereoscopic image.

To provide for a VR/AR display with improved resolution without a corresponding increase in a number of peripheral pixels and its associated computational costs, in at least one embodiment the near-eye display systems described herein utilize a dynamic technique wherein an eye tracking component is utilized to determine the current pose (position and/or rotation) of the user's eye and, based on this current pose, adjusts a de-magnification optical element and the rendering of foveal image content in the integral lightfield frame. In at least one embodiment, a method of operation of the near-eye display system includes determining, using an eye tracking component of the near-eye display system, a first pose of a user's eye and decreasing a magnification level at which foveal image content is to be displayed within the foveal field of view for the first pose. The decreased magnification level of the foveal image content is perceptible at a resolution higher than a native resolution of the display panel. Thus, de-magnifying regions of the display responsive to changes in the pose of the eye where the user is looking effectively provides for the field of view imaged by the foveal region of the user's eye to be perceived at an increased resolution without requiring a corresponding increase in the actual native resolution at all other regions of the display panel, thereby providing increased perceived screen resolution without significantly increasing power, computational, rendering, and transmission bandwidth requirements.

FIG. 1 illustrates a near-eye display system 100 incorporating eye-tracked lens adjustment in accordance with at least one embodiment. In the depicted example, the near-eye display system 100 includes a computational display sub-system 102, a rendering component 104, and one or more eye tracking components, such as one or both of an eye tracking component 106 for tracking a user's left eye and an eye tracking component 108 for tracking the user's right eye. The computational display sub-system 102 includes a left-eye display 110 and a right-eye display 112 mounted in an apparatus 114 (e.g., goggles, glasses, etc.) that places the displays 110, 112 in front of the left and right eyes, respectively, of the user.

As shown by view 116, each of the displays 110, 112 includes at least one display panel 118 to display a sequence or succession of integral lightfield frames (hereinafter, "lightfield frame" for ease of reference), each of which includes an array 120 of elemental images 122. For ease of reference, an array 120 of elemental images 122 may also be referred to herein as a lightfield frame 120. Each of the displays 110, 112 further includes an array 124 of lenslets 126 (also commonly referred to as "microlenses") overlying the display panel 118. Typically, the number of lenslets 126 in the lenslet array 124 is equal to the number of elemental images 122 in the array 120, but in other implementations the number of lenslets 126 may be fewer or greater than the number of elemental images 122. Note that while the example of FIG. 1 illustrates a 5×4 array of elemental images 122 and a corresponding 5×4 array 120 of lenslets 126 for ease of illustration, in a typical implementation the number of elemental images 122 in a lightfield frame 120 and the number of lenslets 126 in the lenslet array 124 typically is much higher. Further, in some embodiments, a separate display panel 118 is implemented for each of the displays 110, 112, whereas in other embodiments the left-eye display 110 and the right-eye display 112 share a single display panel 118, with the left half of the display panel 118 used for the left-eye display 110 and the right half of the display panel 118 used for the right-eye display 112.

Cross-view 128 of FIG. 1 depicts a cross-section view along line A-A of the lenslet array 124 overlying the display panel 118 such that the lenslet array 124 overlies the display surface 130 of the display panel 118 so as to be disposed between the display surface 130 and the corresponding eye 132 of the user. In this configuration, each lenslet 126 focuses a corresponding region of the display surface 130 onto the pupil of the eye, with each such region at least partially overlapping with one or more adjacent regions. Thus, in such computational display configurations, when an array 120 of elemental images 122 is displayed at the display surface 130 of the display panel 118 and then viewed by the eye 132 through the lenslet array 124, the user perceives the array 120 of elemental images 122 as a single image of a scene. Thus, when this process is performed in parallel for both the left eye and right eye of the user with the proper parallax implemented therebetween, the result is the presentation of autostereoscopic three-dimensional (3D) imagery to the user.

As also shown in FIG. 1, the rendering component 104 includes a set of one or more processors, such as the illustrated central processing unit (CPU) 136 and graphics processing units (GPUs) 138, 140 and one or more storage components, such as system memory 142, to store software programs or other executable instructions that are accessed and executed by the processors 136, 138, 140 so as to manipulate the one or more of the processors 136, 138, 140 to perform various tasks as described herein. Such software programs include, for example, rendering program 144 including executable instructions for a de-magnifying lens actuation and de-magnifying lens distortion compensation process, as described below, as well as an eye tracking program 146 including executable instructions for an eye tracking process, as also described below.

In operation, the rendering component 104 receives rendering information 148 from a local or remote content source 150, where the rendering information 148 represents graphics data, video data, or other data representative of an object or scene that is the subject of imagery to be rendered and displayed at the display sub-system 102. Executing the rendering program 144, the CPU 136 uses the rendering information 148 to send drawing instructions to the GPUs 138, 140, which in turn utilize the drawing instructions to render, in parallel, a series of lightfield frames 154 for display at the left-eye display 110 and a series of lightfield frames 156 for display at the right-eye display 112 using any of a variety of well-known VR/AR computational/lightfield rendering processes. As part of this rendering process, the CPU 136 may receive pose information 151 from an inertial management unit (IMU) 152, whereby the pose information 151 is representative of a current pose of the display sub-system 102 and control the rendering of one or more pairs of lightfield frames 154, 156 to reflect the viewpoint of the object or scene from the current pose.

As described in detail below, the rendering component 104 further may use eye pose information from one or both of the eye tracking components 106, 108 to shift the position of a de-magnifying lens 160 positioned so as to be disposed between the display surface 130 and the corresponding eye 132 of the user, thereby adjusting the magnification of the portion of the display surface 130 over which the de-magnifying lens 160 is positioned and the magnification of one or more of the elemental images 122 for the lightfield frame so displayed. To this end, the eye tracking components 106, 108 each may include one or more infrared (IR) light sources (referred to herein as "IR illuminators) to illuminate the corresponding eye with IR light, one or more imaging cameras to capture the IR light reflected off of the corresponding eye as a corresponding eye image (eye image information 158), one or more mirrors, waveguides, beam splitters, and the like, to direct the reflected IR light to the imaging cameras, and one or more processors to execute the eye tracking program 146 so as to determine a current position, current orientation, or both (singularly or collectively referred to herein as "pose") of the corresponding eye from the captured eye image. Any of a variety of well-known eye tracking apparatuses and techniques may be employed as the eye tracking components 146, 148 to track one or both eyes of the user.

In a conventional computational display-based system, the display panels typically include arrays of pixels with uniform pixel density throughout the display, which are overlaid with magnification optics to provide the viewer with a wider field of view. However, such conventional computational displays present imagery at resolutions that are limited compared to the typical human visual capability. As used herein, the resolution of HMDs is defined in terms of field of view (FOV) as measured in degrees, or pixels per degree (ppd). The human eye is capable of detecting approximately 60 ppd at the fovea (i.e., the part of the retina where visual acuity is highest). The 60 pixels per degree figure is sometimes expressed as "1 arc-minute per pixel." For visual quality, any display resolution above 60 pixels per degree is wasted resolution as the human eye is generally unable to discern any additional detail. This is referred to as "retinal resolution" or eye-limiting resolution. As used herein, the term "foveal field of view" generally refers to a visual zone occurring inside an area +/−5 degrees horizontal and +/−5 degrees vertical of the optical axis of the eye, forming an approximately 10 degrees diameter field of view associated with the fovea and centered on a position where the user's gaze is currently looking.

For example, consider a conventional 1920×1080 pixel display panel (e.g., LCD or OLED display panel having 1,920 pixels displayed across the screen horizontally and 1,080 pixels displayed down the screen vertically). When the 1920×1080 pixel display panel is viewed in an HMD having a total field of view of 100 degrees (e.g., both horizontally and vertically), imagery is presented with a linear pixel density—number of pixels per degree presented to the eye—of approximately 19.2 pixels per degree (i.e., approximately a third of the resolution of the human foveal vision in the foveal field of view) along the horizontal direction. Similarly, imagery is presented with a linear pixel density of approximately 10.8 pixels per degree along the vertical direction, for a total resolution of approximately 192×108 pixels in the foveal field of view. In contrast, the typical retinal resolution of the human eye is 600×600 pixels in the foveal field of view, or approximately 17 times higher than displayed by the conventional 1920×1080 pixel display panel. Accordingly, a near-eye display system in which a 1920×1080 pixel display panel is used for imagery display across a total field of view of 100 degrees has a native resolution of 19.2 ppd horizontal resolution and 10.8 ppd vertical resolution.

As described herein, in at least one embodiment the near-eye display system 100 improves the resolution of portions of the one or more pairs of lightfield frames 154, 156 that the user's eye gaze is directed at by implementing a de-magnifying lens 160 configured to de-magnify corresponding regions of the display panel 118 is focused on by the eye 132, and thereby presenting more pixels for display in the user's foveal field of view and at a resolution higher than the native resolution of the display panel 118. This is accomplished by using the eye tracking components 106, 108 to track one or both eyes of the user so as to determine the current pose of one or both of the eyes for a corresponding lightfield frame to be displayed. With the current pose determined, the rendering component 104 instructs an actuator (not shown) to physically move the de-magnifying lens 160 to be positioned over a portion of the display surface 130 of the display panel 118 so as to de-magnify imagery aligned with the foveal field of view to the corresponding eye 132 of the user for the current pose. The rendering component 104 additionally instructs the rendering program 144 to perform a de-magnifying lens distortion compensation process. In various embodiments, the de-magnifying lens distortion compensation process includes pre-distorting, based on the current pose of the user's eyes, the lightfield frames 154, 156 to reverse distortion expected to be introduced by the magnifying lens 160 such that imagery in the foveal field of view received at the eye 132 properly represents the viewpoint of an object or scene from the current pose without any distortion effects. In this manner, the de-magnifying lens 160 increases the resolution of imagery displayed in the foveal field of view so that the FOV imaged by the fovea of the eye is perceived as an image with a resolution higher than the native resolution of the display panel 118 without requiring an increase to the native resolution of the display panel 118.

Figure 2:
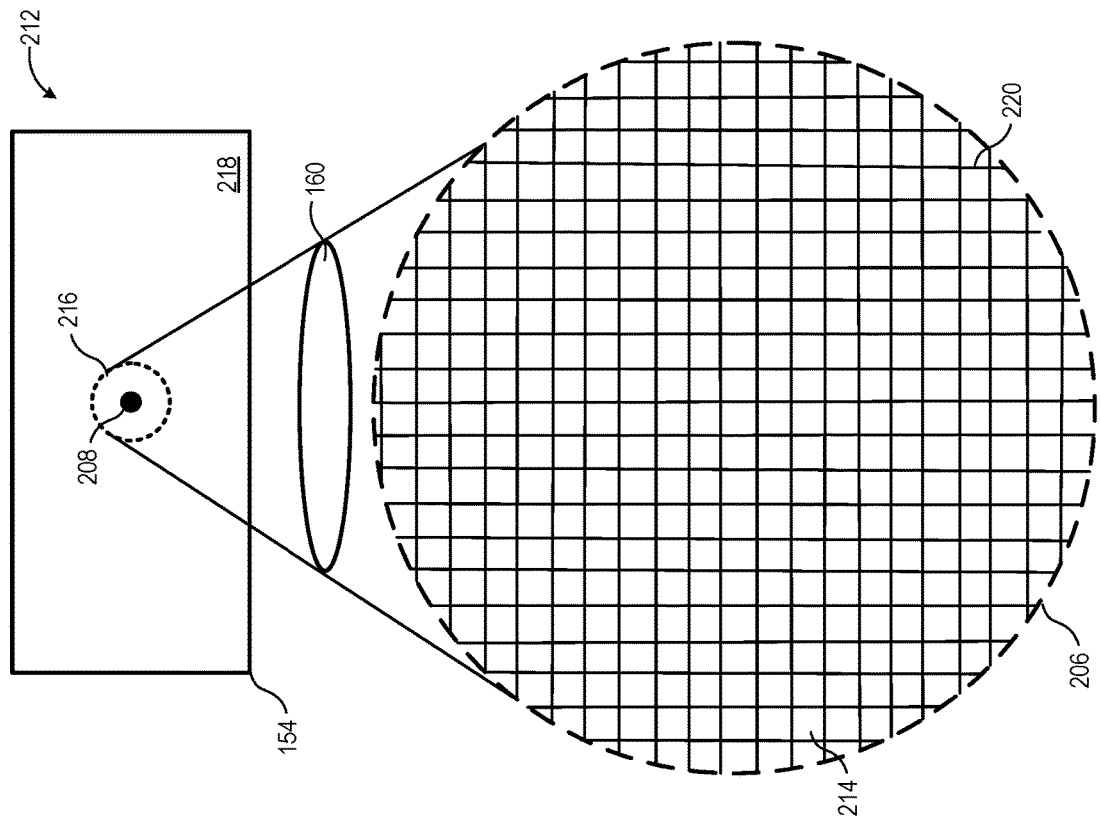
FIG. 2 is a diagram illustrating an example of resolution enhancement in a foveal field of view in the near-eye display system of FIG. 1 in accordance with some embodiments.
Figure 2:
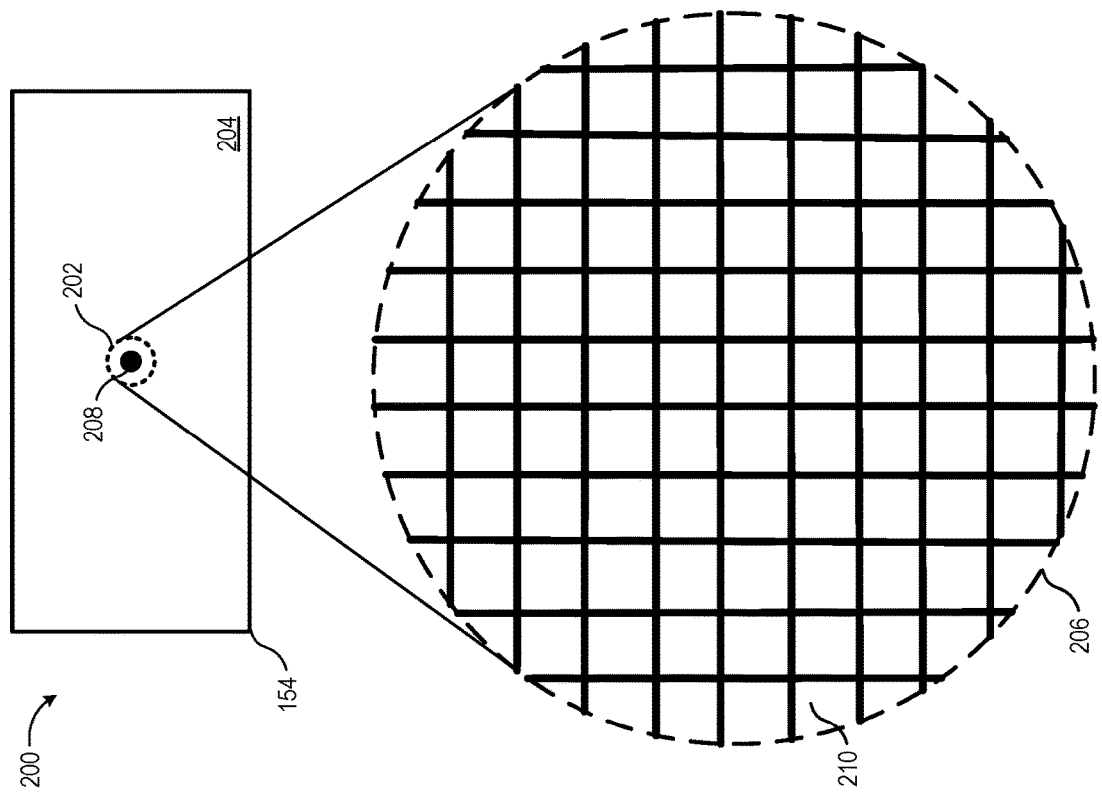

To illustrate, FIG. 2 depicts views of a computational display such as the ones utilized in the near-eye display system 100 from the perspective of the user's foveal field of view in accordance with some embodiments. As shown in view 200, an image to be rendered (e.g., a lightfield frame 154 of FIG. 1) is spatially partitioned into a foveal region 202 that corresponds to a user's gaze direction with respect to the display panel on which the image is to be displayed) and one or more peripheral region(s) 204 surrounding the foveal region 202. The foveal field of view 206 corresponds to the approximately 10 degrees diameter field of view associated with the fovea and centered on a position where the user's gaze is currently looking (i.e., the gaze target location 208). The foveal field of view 206 of the user for the current pose perceives a pixel array 210 for a conventional computational display in view 200. Those skilled in the art will recognize that the dimensions of the foveal region 202 and the foveal field of view 206 (as measured in pixels) will vary based on a number of factors, including but not limited to the overall resolution of the display panel on which the image is displayed (e.g., the display panel 118 of FIG. 1), the number of different peripheral regions to be implemented, the distance between the display panel and the user's eye, the presence of any lenses or other optical systems between the pixel array and the user's eye and their effect on the user's perception of the display, and the like.

As illustrated in view 212, to increase resolution of imagery perceived by the user's eye in the foveal field of view 206, a de-magnifying lens 160 is positioned between the display panel on which the image is to be displayed and the user's eye. Similar to view 200, the foveal field of view 206 corresponds to the approximately 10 degrees diameter field of view associated with the fovea and centered on the same gaze target location 208. However, due to the positioning of de-magnifying lens 160, the number of perceivable pixels in the foveal field of view 206. To illustrate, for the example of FIG. 2, the de-magnifying lens 160 includes optical properties to de-magnify by a factor of two. With the de-magnifying lens 160, the foveal field of view 206 of the user for the current pose perceives a pixel array 214 including twice as many pixels horizontally and twice as many pixels vertically relative to the pixel array 210. Accordingly, the pixel array 214 represents a 4× increase in the total number of perceivable pixels that the user is able to see relative to the pixel array 210.

As shown in view 212, an image to be rendered (e.g., a lightfield frame 154 of FIG. 1) is spatially partitioned into a foveal region 216 that corresponds to a user's gaze direction with respect to the display panel on which the image is to be displayed) and one or more peripheral region(s) 218 surrounding the foveal region 216. Those skilled in the art will recognize that the dimensions of the foveal field of view 206 and its corresponding foveal region 216 (as measured in pixels) for the view 212 will vary based on a number of factors, including but not limited to the overall resolution of the display panel on which the image is displayed (e.g., the display panel 118 of FIG. 1), the number of different peripheral regions to be implemented, the distance between the display panel and the user's eye, the presence of any lenses or other optical systems between the pixel array and the user's eye and their effect on the user's perception of the display, and the like. However, it should be appreciated that the foveal region 216 of the lightfield frame 154 to be rendered for view 212 will be larger in size relative to the foveal region 202 of view 200.

The lightfield frame 154 is rendered such that foveal image content in the foveal region 216 is at a native resolution of the display panel 118. When the magnification level of the foveal image content is decreased by the de-magnifying lens 160 such as to fit within the foveal field of view 206 for the current pose in view 212, the foveal image content is perceptible at a resolution higher than the native resolution of the display panel 118. Accordingly, the de-magnifying lens 160 increases the resolution of imagery displayed in the foveal field of view 206 without requiring an increase to the native resolution of the display panel 118 displaying the lightfield frame 154 by using an increased number of pixels of the total display pixels of display panel 118 for foveated rendering and display. The one or more peripheral regions 218 is defined as the remaining pixels of the display panel 118 not devoted to the foveal region 216 and is rendered for display at a lower resolution than the foveal field of view 206. In this manner, the de-magnifying lens 160 allows for resolution enhancement in a foveal field of view such that the user perceives imagery to be presented by a higher resolution display than the native resolution of display panel 118.

Additionally, the de-magnifying lens 160 reduce the visibility of screen-door effects. HMDs and other near-eye display devices may have challenges associated with the limited pixel density of displays. Of particular issue in organic light emitting diode (OLED)-based displays and other similar displays is the relatively low pixel fill factor; that is, the relatively large degree of "black space" between pixels of the OLED-based displays. While this black space is normally undetectable for displays having viewing distances greater than arm's length from the user, in HMDs and other near-eye displays this black space may be readily detectable by the user due to the close proximity of the display to the user's eyes. The visibility of the spacing between pixels (or sub-pixels) is often exacerbated due to magnification by the optics overlying the display panel. Therefore, there occurs a screen-door effect, in which a lattice resembling a mesh screen is visible in an image realized in the display, which typically interferes with user immersion in the virtual reality (VR) or augmented reality (AR) experience. However, as illustrated in view 212, the decrease in magnification by the de-magnifying lens 160 by a factor of two not only decreases perceived pixel size in pixel array 214 to fit more pixels within the foveal field of view 206, but further decreases the dimensions of the non-emissive space 220 between pixels and reducing the perceivability of screen-door effects.

Although FIGS. 1-2 are described here in the context of a mechanically actuated de-magnifying lens 160 with fixed optical properties, those skilled in the art will recognize that any variable-index material and/or variable-index optical component may be used without departing from the scope of this disclosure. For example, in some embodiments, the near-eye display system 100 includes a position-adjustable liquid crystal (LC) lens constructed from nematic liquid crystal cells rather than using de-magnifying lens 160 with fixed optical properties. The nematic LC lens is electrically addressable using, for example, a voltage source (not shown). Changes in an applied voltage to the LC lens cause the refractive index of the LC lens to change, thereby changing a focal length and/or magnification level of light passing through the LC lens. In other embodiments, rather than a position-adjustable nematic LC lens, the near-eye display system 100 includes a LC lenslet array or a layer of variable-magnification material (such as constructed out of nematic liquid crystal cells or other variable-focus optical components configured to have variable magnifications) is positioned so as to be disposed between the display panel 118 and the user's eye 132.

Additionally, in some other embodiments, focal length of light projected from the lenslet array 124 may further be adjusted by combining the variable-index lenses or layer of variable-index material with a mechanical actuator (not shown) to change the physical distance between the lenslet array 124, the de-magnifying lens 160, the layer of variable-index material, the display panel 118, and the eye 132. For example, such mechanical actuators may include piezo-electric, voice-coil, or electro active polymer actuators.

In one embodiment, a voltage is applied to the LC lenslet array or the layer of variable-index material as a whole. Accordingly, each individual lenslet or the entire layer of variable-index material receives the same voltage for adjusting its refractive index. In another embodiment, each of the lenslets are individually addressable and can receive a different voltage from one another. Similarly, the layer of variable-index material may be pixelated, with each of the pixelated areas of the layer of variable-index material being individually addressable. This allows greater control over the optical properties and magnification levels of imagery projected for user viewing. Those skilled in the art will recognize that any segmentation of the LC lenslet array or the layer of variable-index material into spatially-varying addressable partitions may be used without departing from the scope of this disclosure. Accordingly, any de-magnifying lens 160, LC lens, LC lenslet array, layer of variable-index material, other optical elements capable of de-magnifying imagery, and any combination of one or more of such optical elements may be used without departing from the scope of this disclosure and is interchangeable with the term "de-magnification optical element."

Figure 3:
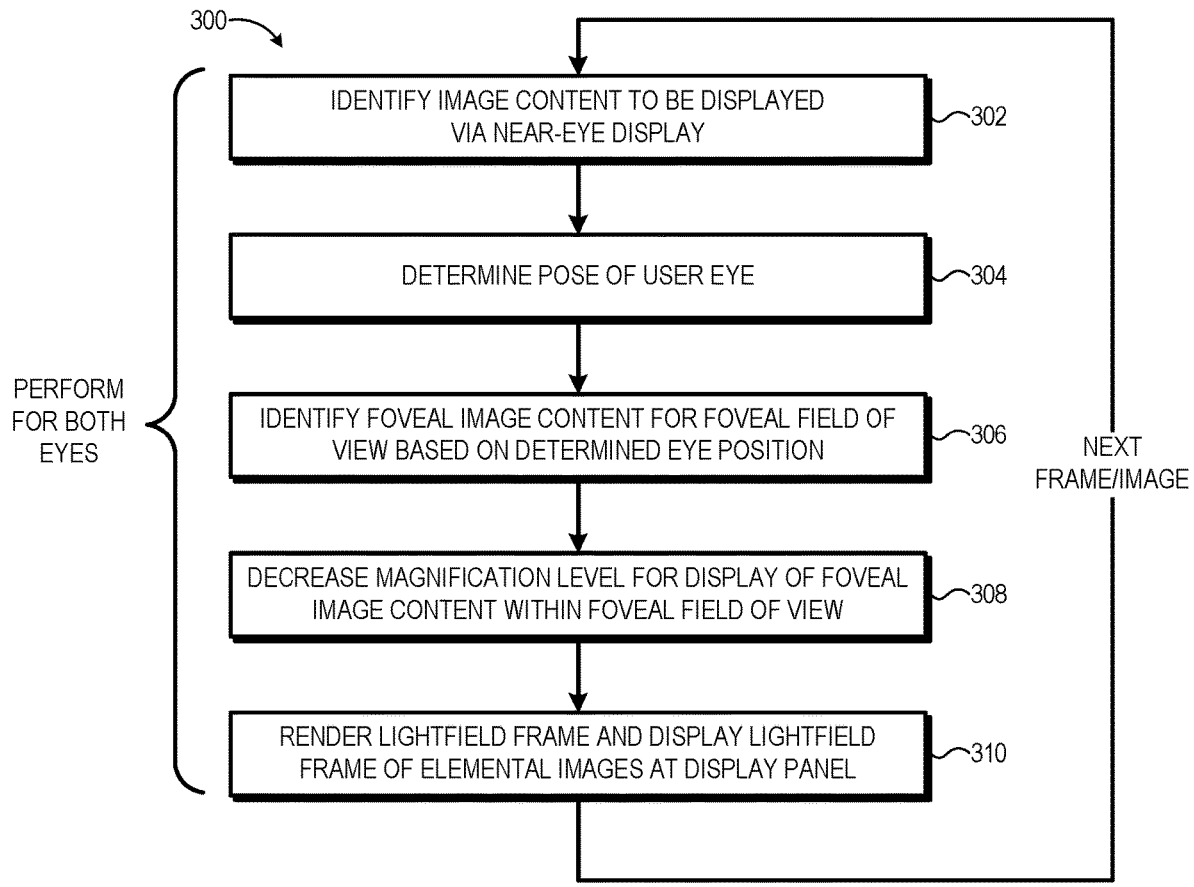
FIG. 3 is a flow diagram illustrating a method for resolution enhancement in a foveal field of view in the near-eye display system of FIG. 1 in accordance with some embodiments.

FIG. 3 illustrates a method 300 of operation of the near-eye display system 100 for rendering lightfield frames using de-magnification optical elements to provide foveal field of view resolution enhancement in accordance with some embodiments. The method 300 illustrates one iteration of the process for rendering and displaying a lightfield frame for one of the left-eye display 110 or right-eye display 112, and thus the illustrated process is repeatedly performed in parallel for each of the displays 110, 112 to generate and display a different stream or sequence of lightfield frames for each eye at different points in time, and thus provide a 3D, autostereoscopic VR or AR experience to the user.

For a lightfield frame to be generated and displayed, method 300 starts at block 302, whereby the rendering component 104 identifies the image content to be displayed to the corresponding eye of the user as a lightfield frame. In at least one embodiment, the rendering component 104 receives the IMU information 151 representing data from various pose-related sensors, such as a gyroscope, accelerometer, magnetometer, Global Positioning System (GPS) sensor, and the like, and from the IMU information 151 determines a current pose of the apparatus 114 (e.g., HMD) used to mount the displays 110, 112 near the user's eyes. From this current pose, the CPU 136, executing the rendering program 144, can determine a corresponding current viewpoint of the subject scene or object, and from this viewpoint and graphical and spatial descriptions of the scene or object provided as rendering information 148, determine the imagery to be rendered for the current pose.

Figure 4:
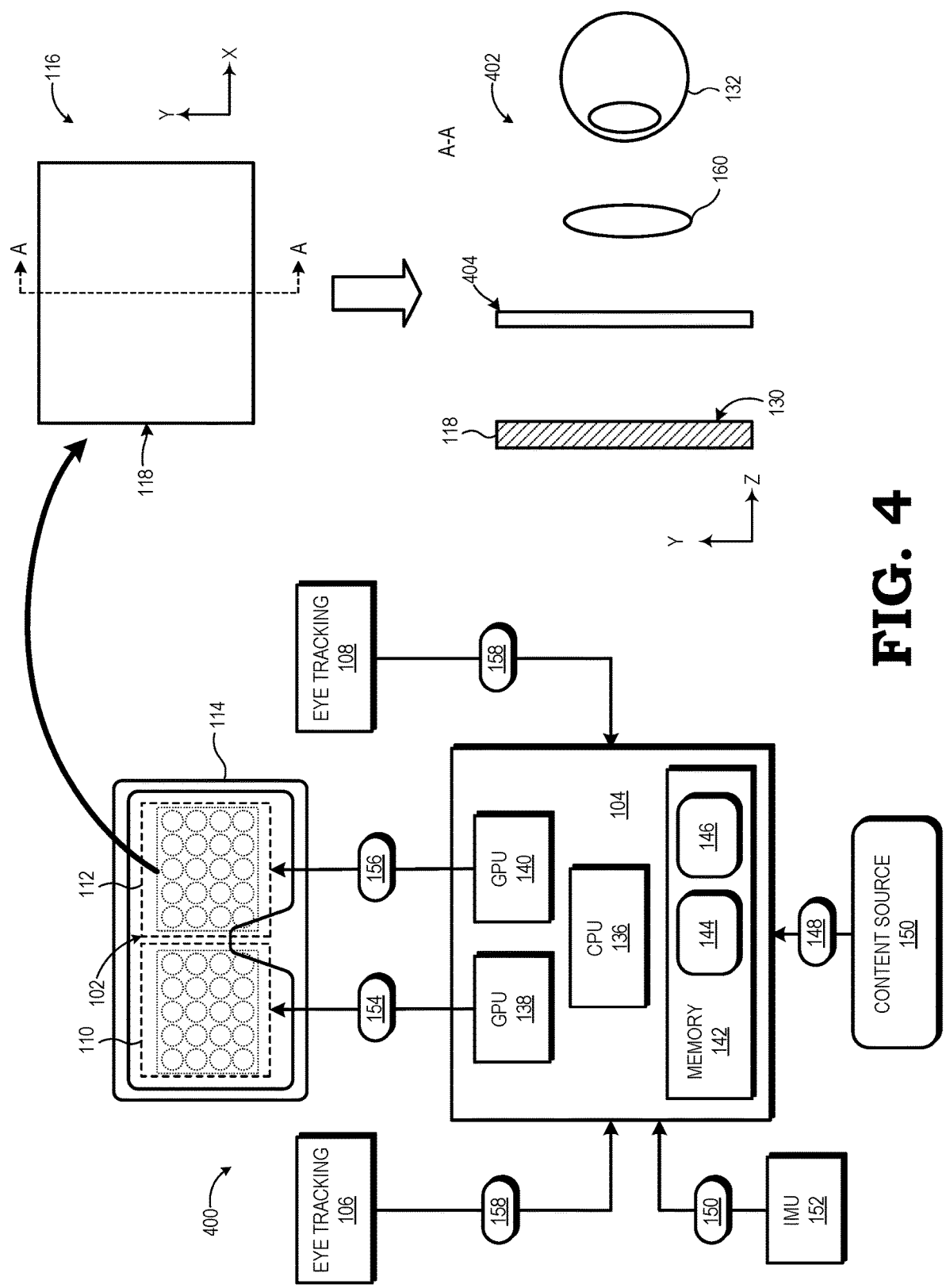
FIG. 4 is a diagram illustrating a display system incorporating eye-tracked lens adjustment in accordance with some embodiments.

At block 304, the CPU 136, executing eye tracking program 146, determines the current pose of the corresponding eye of the user. As explained herein, the current pose of an eye may be determined using any of a variety of eye tracking techniques. Generally, such techniques include the capture of one or more images of IR light reflected from the pupil and cornea of the eye. The eye tracking program 146 then may manipulate the CPU 136 or the GPUs 138, 140 to analyze the images to determine the pose of the eye based on the corresponding position of one or both of the pupil reflection or corneal reflection. Further, the orientation of the pupil relative to the cornea in turn may be used to determine the orientation of the eye (that is, the direction of gaze of the eye). It should be noted that although block 304 is illustrated in FIG. 4 as being subsequent to block 304, the process of block 304 may be performed before, during, or after the process of block 302.

With the current pose of the user's eye determined, at block 306 the rendering component 104 manipulates the CPU 136 to identify a foveal field of view and its corresponding foveal image content to be rendered for the current pose. With the foveal image content identified, at block 308, the rendering component 104 manipulates the CPU 136 to decrease a magnification level at which the foveal image content is to be displayed within the foveal field of view. In some embodiments, such as explained above in more detail relative to FIGS. 1-2, decreasing the magnification level includes actuating the de-magnifying lens 160 to be positioned between a foveal region 216 of the integral lightfield frame and the foveal field of view 214 of the user's eye for the first pose. In other embodiments, the rendering component 104 manipulates the CPU 136 to calculate a voltage to be applied to a variable-index material. As part of this process, the CPU 136 also instructs the calculated voltage to be applied for inducing a change in the refractive index of the variable-index material, which in turn causes a change in the magnification of imagery exiting the lenslets discussed herein.

For example, referring back to FIGS. 1 and 2, some embodiments include constructing lenslets or LC lenslet arrays out of variable-index material. Accordingly, applying the calculated voltage to the lenslets directly changes their refractive indexes and changes the magnification level of imagery exiting the lenslet array. In other embodiments, the variable-index material is provided as a layer disposed between the display panel 118 and the foveal field of view of the user's eye. In such embodiments, applying the calculated voltage to the layer of variable-index material changes the refractive index and changes the magnification level of imagery exiting the layer of variable-index material.

The GPU subsequently renders the lightfield frame at block 310 and provides the lightfield frame to the corresponding one of the computational displays 110, 112 for display to the eye 132 of the user with the identified foveal image content rendered for display at the decreased magnification level of blocks 306 and 308. In some embodiments, such as described above in more detail relative to FIG. 2, an array of elemental images forming the lightfield frame 154 is rendered based on the pose of the user's eye determined at block 304 and the decreased magnification level of the foveal image content. The lightfield frame 154 is rendered to include the foveal image content in a foveal region 216 at a native resolution of the display panel 118. When the magnification level of the foveal image content is decreased such as to fit within the foveal field of view 206 for the current pose, the foveal image content is perceptible at a resolution higher than the native resolution of the display panel 118.

The operations of block 310 include rendering, based on the identified foveal image content and the decreased magnification level, the integral lightfield frame with the foveal region 216 and at least one peripheral region 218. In one embodiment, the lightfield frame is rendered such that the foveal region 216 has a higher resolution than the at least one peripheral region 218. In another embodiment, the lightfield frame is rendered such that the foveal region 216 is rendered at the same resolution (e.g., the native resolution of display panel 118) as the at least one peripheral region 218. However, image content in the foveal region 216 will be perceived to be at a higher resolution than image content in the at least one peripheral region 218 due to positioning of de-magnification optical elements for displaying foveal image content within the foveal field of view.

In some embodiments, the operations of block 310 also includes the rendering program 144 manipulating the CPU 136 to determine the physics and location of distortion expected to be caused by the decreased magnification level of the foveal image content. The rendering program 144 performs pre-magnification distortion by distorting, based on the determined current pose, rendering of one or more of the array of elemental images to compensate for visual distortions expected to be caused by the decreased magnification level of the foveal image content such that imagery in the foveal field of view 216 properly represents the viewpoint of an object or scene from the current pose without any distortion effects. Additionally, in various embodiments, the rendering program 144 additionally performs distorting the rendering of imagery in non-foveal portions of the image (e.g., within the at least one peripheral region 218) to compensate for visual distortions expected to be caused by de-magnification and the use of an increased number of pixels for display of foveal image content. It should also be noted that although block 310 is illustrated in FIG. 3 as being the last step of method 300, the process of block 310 may also be performed before, during, or after the process of block 302.

Although described in FIGS. 1-3 in the context of lightfield displays, those skilled in the art will recognize that the methods and systems for foveal image content demagnification to provide resolution enhancement may be utilized in various other display systems without departing from the scope of the present disclosure. For example, in various embodiments, the left-eye display 110 and/or the right-eye display 112 may include but is not limited to a liquid crystal display (LCD), a light emitting diode (LED) display, an organic light emitting diode (OLED) display, a microelectromechanical systems (MEMS) display, a projector, an electronic paper display, and the like. Further, in other embodiments, the left-eye display 110 and/or the right-eye display 112 may include micro-displays implemented using a transmissive projection technology where the light source is modulated by optically active material, backlit with white light. These technologies are usually implemented using LCD type displays with backlights and high optical energy densities. Microdisplays can also be implemented using a reflective technology for which external light is reflected and modulated by an optically active material. The illumination is forward lit by either a white source or RGB source, depending on the technology. For example, digital light processing (DGP) and liquid crystal on silicon (LCOS) are examples of reflective technologies which are efficient as most energy is reflected away from the modulated structure. Additionally, the microdisplay can be implemented using an emissive technology where light is generated by the display, such as emission of a laser signal with a micro mirror steering either onto a screen that acts as a transmissive element or beamed directly into the eye.

FIG. 4 illustrates a display system 400 incorporating eye-tracked lens adjustment in accordance with at least one embodiment. In the depicted example, the display system 400 includes a display sub-system 102, a rendering component 104, and one or more eye tracking components, such as one or both of an eye tracking component 106 for tracking a user's left eye and an eye tracking component 108 for tracking the user's right eye. The display sub-system 102 includes a left-eye display 110 and a right-eye display 112 mounted in an apparatus 114 (e.g., goggles, glasses, visor, helmet, and the like) that places one or more displays 110, 112 in front of the left and right eyes, respectively, of the user. In some embodiments, the apparatus 114 includes a binocular HMD (or optical head-mounted display (OMID)) that positions the left-eye display 110, the right-eye display 112, and other associated display optics in front of the left and right eyes, respectively, of the user. In other embodiments, the apparatus 114 includes a binocular HMD (or OHMD for augmented/blended reality viewing) that positions one of the left-eye display 110 or the right-eye display 112 (and their associated display optics) in front of the respective eye of the user for viewing.

As shown by view 116, each of the displays 110, 112 includes at least one display panel 118 to display a sequence or succession of image frames. Further, in some embodiments, a separate display panel 118 is implemented for each of the displays 110, 112, whereas in other embodiments the left-eye display 110 and the right-eye display 112 share a single display panel 118, with the left half of the display panel 118 used for the left-eye display 110 and the right half of the display panel 118 used for the right-eye display 112.

Cross-view 402 of FIG. 4 depicts a cross-section view along line A-A overlying the display panel 118. Thus, in such display configurations, when image frames are displayed at the display surface 130 of the display panel 118 and then viewed by the eye 132, and when this process is performed in parallel for both the left eye and right eye of the user with the proper parallax implemented therebetween, the result is the presentation of autostereoscopic three-dimensional (3D) imagery to the user.

As also shown in FIG. 4, the rendering component 104 includes a set of one or more processors, such as the illustrated central processing unit (CPU) 136 and graphics processing units (GPUs) 138, 140 and one or more storage components, such as system memory 142, to store software programs or other executable instructions that are accessed and executed by the processors 136, 138, 140 so as to manipulate the one or more of the processors 136, 138, 140 to perform various tasks as described herein. Such software programs include, for example, rendering program 144 including executable instructions for a de-magnifying lens actuation and de-magnifying lens distortion compensation process, as described below, as well as an eye tracking program 146 including executable instructions for an eye tracking process, as also described below.

In operation, the rendering component 104 receives rendering information 148 from a local or remote content source 150, where the rendering information 148 represents graphics data, video data, or other data representative of an object or scene that is the subject of imagery to be rendered and displayed at the display sub-system 102. Executing the rendering program 144, the CPU 136 uses the rendering information 148 to send drawing instructions to the GPUs 138, 140, which in turn utilize the drawing instructions to render, in parallel, a series of image frames 154 for display at the left-eye display 110 and a series of image frames 156 for display at the right-eye display 112 using any of a variety of well-known VR or AR computational rendering processes. As part of this rendering process, the CPU 136 may receive pose information 151 from an inertial management unit (IMU) 152, whereby the pose information 151 is representative of a current pose of the display sub-system 102 and control the rendering of one or more pairs of image frames 154, 156 to reflect the viewpoint of the object or scene from the current pose.

As described in detail below, the rendering component 104 further may use eye pose information from one or both of the eye tracking components 106, 108 to shift the position of a de-magnifying lens 160 positioned so as to be disposed between the display surface 130 and the corresponding eye 132 of the user, thereby adjusting the magnification of the portion of the display surface 130 over which the de-magnifying lens 160 is positioned and the magnification of a region of the image frame so displayed. To this end, the eye tracking components 106, 108 each may include one or more infrared (IR) light sources (referred to herein as "IR illuminators) to illuminate the corresponding eye with IR light, one or more imaging cameras to capture the IR light reflected off of the corresponding eye as a corresponding eye image (eye image information 158), one or more mirrors, waveguides, beam splitters, and the like, to direct the reflected IR light to the imaging cameras, and one or more processors to execute the eye tracking program 146 so as to determine a current position, current orientation, or both (singularly or collectively referred to herein as "pose") of the corresponding eye from the captured eye image. Any of a variety of well-known eye tracking apparatuses and techniques may be employed as the eye tracking components 146, 148 to track one or both eyes of the user.

As described herein, in at least one embodiment the display system 400 improves the resolution of portions of the one or more pairs of image frames 154, 156 that the user's eye gaze is directed at by implementing a de-magnifying lens 160 configured to de-magnify corresponding regions of the display panel 118 is focused on by the eye 132, and thereby presenting more pixels for display in the user's foveal field of view and at a resolution higher than the native resolution of the display panel 118. This is accomplished by using the eye tracking components 106, 108 to track one or both eyes of the user so as to determine the current pose of one or both of the eyes for a corresponding lightfield frame to be displayed. With the current pose determined, the rendering component 104 instructs an actuator (not shown) to physically move the de-magnifying lens 160 to be positioned over a portion of the display surface 130 of the display panel 118 so as to de-magnify imagery aligned with the foveal field of view to the corresponding eye 132 of the user for the current pose. The rendering component 104 additionally instructs the rendering program 144 to perform a de-magnifying lens distortion compensation process. In various embodiments, the de-magnifying lens distortion compensation process includes pre-distorting, based on the current pose of the user's eyes, the image frames 154, 156 to reverse distortion expected to be introduced by the magnifying lens 160 such that imagery in the foveal field of view received at the eye 132 properly represents the viewpoint of an object or scene from the current pose without any distortion effects. In this manner, the de-magnifying lens 160 increases the resolution of imagery displayed in the foveal field of view so that the FOV imaged by the fovea of the eye is perceived as an image with a resolution higher than the native resolution of the display panel 118 without requiring an increase to the native resolution of the display panel 118.

Alternatively, in other embodiments, the display system 400 includes an optional layer of variable-index material 404 (such as constructed out of nematic liquid crystal cells or other variable-focus optical components configured to have variable focal lengths) is positioned so as to be disposed between the display panel 118 and the eye 132 of the user. Although described here in the context of nematic liquid crystals, those skilled in the art will recognize that any variable-index material and/or variable-focus optical component may be used without departing from the scope of this disclosure. For example, such optical components can include, but is not limited to, deformable membrane mirrors (DMMs), fluid lenses, spatial light modulators (SLMs), electro-optical polymers, etc.

In one embodiment, a voltage is applied to the layer of variable-index material 404 as a whole. Accordingly, the entire layer of variable-index material 404 receives the same voltage for adjusting its refractive index, thereby changing the focal length of light and magnification level of imagery exiting the layer of variable-index material 404. In another embodiment, the layer of variable-index material 158 may be pixelated with multiple different portions; each of the pixelated areas of the layer of variable-index material 404 may be individually addressable. This allows greater control over the magnification level of imagery presented by different portions of the display panel 118.

In other embodiments, the layer of variable-index material 404 may be segmented into two or more partitions. Each partition may be addressed with the same voltage, thereby changing the focal length and magnification level of imagery exiting the layer of variable-index material 404 for that partition only. For example, the layer of variable-index material 158 may be segmented into four equal quadrants that each receive a different voltage signal, into individually addressable rows, into individually columns, etc. Those skilled in the art will recognize that any segmentation of the layer of variable-index material 158 into spatially-varying addressable partitions may be used without departing from the scope of this disclosure.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a near-eye display system, a method comprising:
   determining, using an eye tracking component of the near-eye display system, a first pose of a user's eye;
   identifying, based on the first pose of the user's eye, foveal image content to be displayed within a foveal field of view of the user's eye corresponding to the first pose;
   decreasing, based on the first pose of the user's eye, a magnification level at which the foveal image content is to be displayed within the foveal field of view;
   rendering an array of elemental images forming an integral lightfield frame based on the first pose of the user's eye and the decreased magnification level of the foveal image content;
   displaying the integral lightfield frame at a display panel of the near-eye display system, wherein the foveal image content is perceptible at a resolution higher than a native resolution of the display panel; and
   wherein decreasing the magnification level comprises at least one of:
      applying a voltage to a variable-index material disposed between the display panel and the foveal field of view of the user's eye to induce a change in a refractive index of the variable-index material, wherein the change in the refractive index causes a decrease in a magnification level of imagery exiting the variable-index material; or
      applying a voltage to one or more lenslets in a lenslet array comprising a variable-index material to induce a change in a refractive index of the one or more lenslets, wherein the change in the refractive index causes a decrease in a magnification level of imagery exiting the one or more lenslets.

2. The method of claim 1, wherein decreasing the magnification level comprises:
applying a voltage to the variable-index material.

3. The method of claim 1, wherein decreasing the magnification level comprises:
applying a voltage to the one or more lenslets in the lenslet array.

4. The method of claim 3, wherein decreasing the magnification level further comprises:
applying the voltage to the variable-index material associated with a first portion of the lenslet array to induce a change in the refractive index of the variable-index material, wherein the first portion of the lenslet array is independently addressable relative to a second portion of the lenslet array, and further wherein the change in the refractive index causes a decrease in the magnification level of imagery exiting the first portion without decreasing the magnification level of imagery exiting the second portion of the lenslet array.

5. The method of claim 1, wherein rendering the array of elemental images forming the integral lightfield frame further comprises:
distorting, based on the first pose, rendering of one or more of the array of elemental images to compensate for visual distortions expected to be caused by the decreased magnification level of the foveal image content.

6. The method of claim 1, wherein rendering the array of elemental images forming the integral lightfield frame further comprises:
rendering, based on the identified foveal image content and the decreased magnification level, the integral lightfield frame with a foveal region and at least one peripheral region, wherein the foveal region has a higher resolution than the at least one peripheral region.

7. A near-eye display system, comprising:
a display panel to display an integral lightfield frame comprising an array of elemental images;
an eye tracking component to track a current pose of a user's eye; and
a de-magnification optical element positioned to present foveal image content within a foveal region of the integral lightfield frame to a foveal field of view of the user's eye for the current pose, wherein the foveal image content is perceptible at a resolution higher than a native resolution of the display panel, wherein the de-magnification optical element comprises at least one of:
a liquid crystal (LC) lens and an actuator coupled to the LC lens, the actuator to change a position of the LC lens to be positioned over a portion of the display panel to decrease a magnification level at which foveal image content is displayed within the foveal field of view for the current pose;
a lenslet array comprising a variable-index material to induce a change in a refractive index of one or more lenslets, wherein the change in the refractive index causes a change in a magnification level of imagery exiting the one or more lenslets; or
a layer of variable-index material disposed to be positioned between the display panel and the user's eye, wherein applying a voltage to the variable-index material induces a change in the magnification level at which foveal image content is displayed within the foveal field of view for the current pose.

8. The near-eye display system of claim 7, wherein the de-magnification optical element comprises:
the LC lens and the actuator coupled to the LC lens.

9. The near-eye display system of claim 8, further comprising:
a rendering component configured to apply a voltage to a variable-index material associated with the LC lens to induce a change in refractive index of the variable-index material to change the magnification level at which foveal image content is displayed within the foveal field of view for the current pose.

10. The near-eye display system of claim 7, wherein the de-magnification optical element comprises:
the lenslet array.

11. The near-eye display system of claim 10, further comprising:
a rendering component configured to apply a voltage to the variable-index material associated with a first portion of the lenslet array to induce a change in the refractive index of the variable-index material, wherein the first portion of the lenslet array is independently addressable relative to a second portion of the lenslet array, and further wherein the change in the refractive index causes a change in the magnification level of imagery exiting the first portion without changing the magnification level of imagery exiting the second portion of the lenslet array.

12. The near-eye display system of claim 7, wherein the de-magnification optical element comprises:
the layer of variable-index material.

13. The near-eye display system of claim 7, wherein the eye tracking component comprises:
a set of one or more infrared (IR) illuminators to project light onto the user's eye; and
an imaging camera disposed between the de-magnification optical element and the display panel and oriented towards the user's eye.

14. A rendering system, comprising: at least one processor; an input to receive data from an eye tracking component, the data indicating a pose of a user's eye relative to a near-eye display panel; and a storage component to store a set of executable instructions, the set of executable instructions configured to manipulate the at least one processor to: identify foveal image content to be displayed within a foveal field of view corresponding to the pose of the user's eye; render an integral lightfield frame with a foveal region and at least one peripheral region, wherein the foveal region is rendered to be perceptible at a resolution higher than a native resolution of the near-eye display panel; identify, based on the data indicating the pose of a user's eye relative to the near-eye display panel, foveal image content to be displayed within the foveal field of view corresponding to the pose of the user's eye; and decrease a magnification level at which the foveal image content is to be displayed within the foveal field of view; wherein the set of executable instructions are configured to manipulate the at least one processor to render the integral lightfield frame by at least one of distorting, based on the pose and the decreased magnification level, rendering of one or more of an array of elemental images of the integral lightfield frame to compensate for visual distortions expected to be caused by the decreased magnification level of the foveal image content; rendering, based on the identified foveal image content and the decreased magnification level, the foveal region at a higher resolution than the at least one peripheral region; or rendering, based on the identified foveal image content and the decreased magnification level, the foveal region at a resolution of the at least one peripheral region, and wherein the decreased magnification level associated with the foveal region causes the foveal image content to be perceptible at a resolution different than the resolution of the at least one peripheral region.

\* \* \* \* \*